(12) United States Patent
Zahavi et al.

(10) Patent No.: US 7,779,101 B1
(45) Date of Patent: Aug. 17, 2010

(54) METHOD AND APPARATUS FOR MAPPING AND IDENTIFYING THE ROOT CAUSES OF PERFORMANCE PROBLEMS IN NETWORK-BASED SERVICES

(75) Inventors: William Zahavi, Westborough, MA (US); Amanuel Ronen Artzi, Framingham, MA (US); David Ohsie, Baltimore, MD (US); William Kuhhirte, Redington Shores, FL (US)

(73) Assignee: EMC Corporation, Hopkinton, MA (US)

( * ) Notice: Subject to any disclaimer, the term of this patent is extended or adjusted under 35 U.S.C. 154(b) by 705 days.

(21) Appl. No.: 11/475,774

(22) Filed: Jun. 27, 2006

(51) Int. Cl.
*G06F 15/173* (2006.01)
(52) U.S. Cl. .................. 709/223; 709/203; 709/224
(58) Field of Classification Search .......... 709/223, 709/224, 203, 217, 219
See application file for complete search history.

(56) References Cited

U.S. PATENT DOCUMENTS

| | | | | |
|---|---|---|---|---|
| 6,707,795 B1 * | 3/2004 | Noorhosseini et al. | ...... | 370/242 |
| 6,804,627 B1 * | 10/2004 | Marokhovsky et al. | ...... | 702/182 |
| 7,076,397 B2 * | 7/2006 | Ding et al. | ........... | 702/182 |
| 7,318,178 B2 * | 1/2008 | Steinberg et al. | ............ | 714/47 |
| 7,340,649 B2 * | 3/2008 | Angamuthu et al. | .......... | 714/27 |
| 7,349,340 B2 * | 3/2008 | Sahai et al. | ................ | 370/235 |
| 7,383,191 B1 * | 6/2008 | Herring et al. | .............. | 705/1.1 |
| 2002/0088404 A1 * | 7/2002 | Romeu | ............... | 119/56.1 |
| 2002/0091817 A1 * | 7/2002 | Hill et al. | ................ | 709/224 |
| 2003/0065986 A1 * | 4/2003 | Fraenkel et al. | .............. | 714/47 |
| 2004/0122942 A1 * | 6/2004 | Green et al. | ............... | 709/224 |
| 2006/0074946 A1 * | 4/2006 | Pham | ............... | 707/100 |
| 2006/0095570 A1 * | 5/2006 | O'Sullivan | .................. | 709/224 |
| 2006/0101308 A1 * | 5/2006 | Agarwal et al. | ............... | 714/25 |
| 2008/0177698 A1 * | 7/2008 | Agarwal et al. | ................ | 707/2 |
| 2009/0132704 A1 * | 5/2009 | Emuchay et al. | ........... | 709/224 |
| 2009/0216874 A1 * | 8/2009 | Thain et al. | ................. | 709/224 |
| 2010/0088404 A1 * | 4/2010 | Mani et al. | .................. | 709/224 |

\* cited by examiner

*Primary Examiner*—Lashonda T Jacobs
(74) *Attorney, Agent, or Firm*—Krishnendu Gupta; Joseph D'Angelo

(57) ABSTRACT

A method, apparatus and computer-program product for mapping and identifying root causes of performance problems in network based services, wherein the service is composed of applications and transactions, is disclosed. The method comprises the steps of establishing a performance objective value, and a threshold value therefrom, for selected ones of the transactions for each of the applications, wherein the aggregate of the performance objective values insures a known service performance, monitoring a measure of performance for each of the selected transactions, generating an indication for each of the performance measures that exceeds a corresponding threshold value and determining the cause of the degradation by correlating the transactions generating the indication with the elements executing the transaction.

15 Claims, 10 Drawing Sheets

|  | SP1 | SP2 | SP3 | SP4 | SP5 |
|---|---|---|---|---|---|
| SP1 | 1.00 |  |  |  |  |
| SP2 |  | 1.00 |  |  |  |
| SP3 |  |  | 1.00 |  |  |
| SP4 |  |  |  | 1.00 |  |
| SP5 |  |  |  |  | 1.00 |
| ACCOUNTS RECEIVABLE |  |  |  |  |  |
| t1 | 1.00 | 1.00 | 1.00 |  |  |
| t2 | 1.00 | 1.00 | 1.00 |  |  |
| t3 | 1.00 | 1.00 | 1.00 |  |  |
| ORDER ENTRY |  |  |  |  |  |
| t4 |  | 1.00 | 1.00 | 1.00 |  |
| t5 |  | 1.00 | 1.00 | 1.00 |  |
| t6 |  | 1.00 | 1.00 | 1.00 |  |
| WAREHOUSE |  |  |  |  |  |
| t7 |  |  | 1.00 | 1.00 | 1.00 |
| t8 |  |  | 1.00 | 1.00 | 1.00 |
| t9 |  |  | 1.00 | 1.00 | 1.00 |

FIG. 5C

METHOD AND APPARATUS FOR MAPPING AND IDENTIFYING THE ROOT CAUSES OF PERFORMANCE PROBLEMS IN NETWORK-BASED SERVICES

RELATED APPLICATIONS

This application is related to that patent application concurrently filed in the US Patent and Trademark Office, entitled "Method and Apparatus for Mapping and Identifying Resources for Network-based Services, and afforded Ser. No. 11/475,755, the contents of which are incorporated by reference herein.

FIELD OF THE INVENTION

This application relates to the field of network management, and more particularly to real-time network management performance.

BACKGROUND

Network management is an actively pursued field of endeavor requiring skilled persons with detailed knowledge of network operation. Whether constructing new networks, or adapting or maintaining existing networks, the skills of the operating personnel are needed to provide efficient and cost-effective networks that satisfy specific operating conditions that may be provided in a service level agreement (SLA). Typically, SLA represents criteria such as quality of service (QoS), response time, guaranteed network up-time, etc.

In network construction or maintenance the skills of the network architect are a critical element in the overall network performance. The network architect, with knowledge of the specifications associated with hardware and software equipment (referred to as Service Level Objectives, SLOs) in the underlying infrastructure configuration must translate the SLOs into a measurable higher level network performance (SLA). SLOs typically may represent factors such as CPU utilization, link utilization, inputs/outputs per second, etc.

To perform such a translation, the network architect must balance the number, location, and type of hardware and software that must be deployed to satisfy a specific higher level operating condition; too much equipment and the desired operating conditions are satisfied, but at a cost for purchase and maintenance of equipment; while too little equipment may fail to satisfy certain ones of the operating conditions Alternatively, just the right amount of equipment may satisfy the desired operating condition when the network is fully operating, but may fail to provide sufficient support when one or more equipments fail or are operating at levels for which they are not designed. Such trading cost of the network infrastructure for overall network performance is a skill that is expensive for companies to retain and for persons to maintain. An incorrect trade-off can result in costing the network owner a significant expense, in dollars, for having too much capability or the expense, in business relationships, of having too little capability.

Hence, there is a need in the industry for a method and apparatus for determining the effect of network equipment operating conditions and specifications on overall service performance.

SUMMARY OF THE INVENTION

A method, apparatus and computer-program product for mapping and identifying root causes of performance problems in network based services, wherein the service is composed of applications and transactions, is disclosed. The method comprises the steps of establishing a performance objective value, and a threshold value therefrom, for selected ones of the transactions for each of the applications, wherein the aggregate of the performance objective values insures a known service performance, monitoring a measure of performance for each of the selected transactions, generating an indication for each of the performance measures that exceeds a corresponding threshold value and determining the cause of the degradation by correlating the transactions generating the indication with the elements executing the transaction.

BRIEF DESCRIPTION OF THE FIGURES

The above and further advantages of the present invention may be better understood by referring to the following description taken into conjunction with the accompanying drawings in which:

FIGS. 5A-5C illustrate an example for determining network operating conditions in accordance with the principles of the invention.

DETAIL DESCRIPTION

Figure 1:
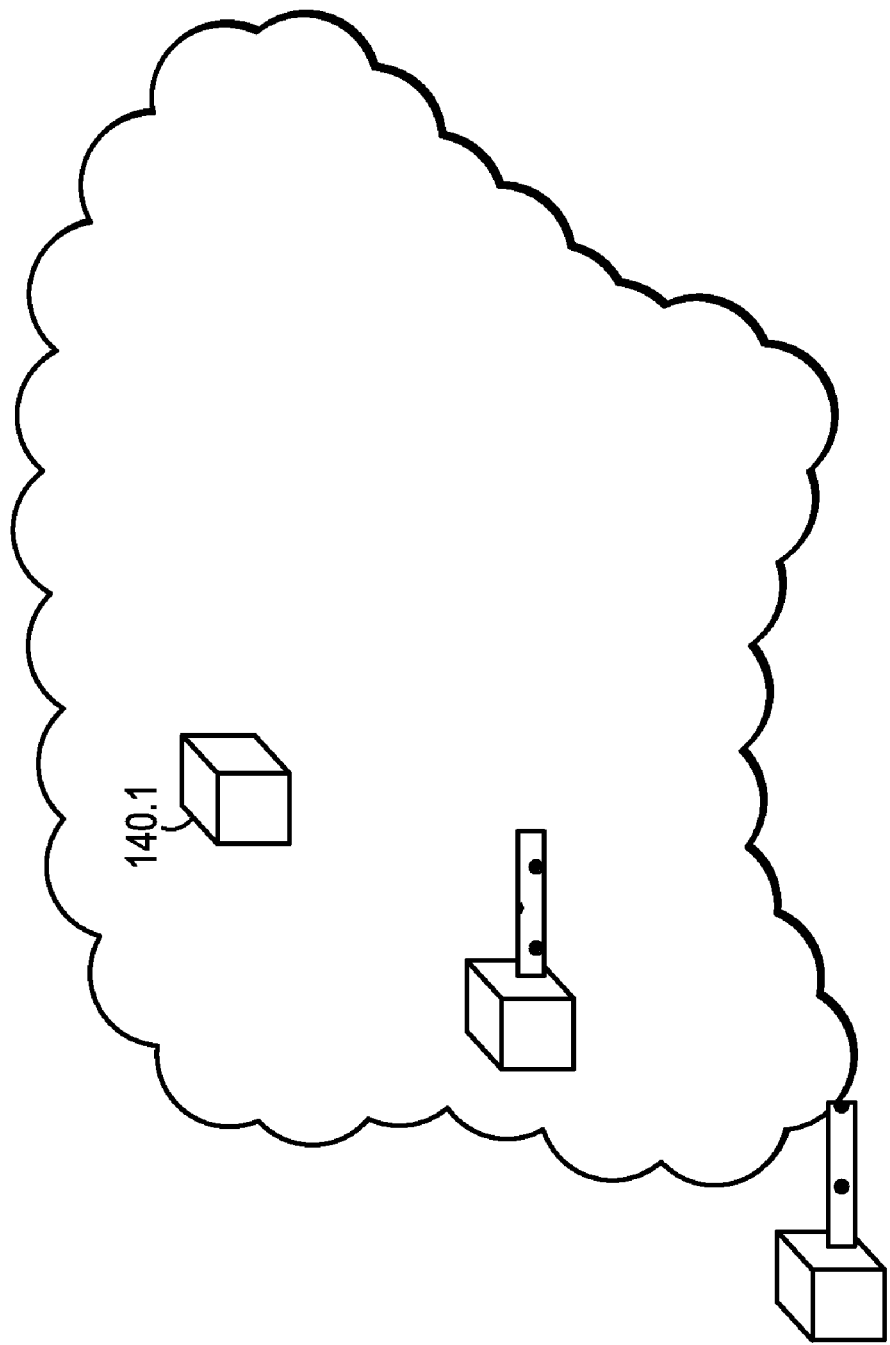
FIG. 1 illustrates a conventional network performing typical transactions.

FIG. 1 illustrates an exemplary network 100 for conducting transactions over one or more networks 110.1, 110.2, . . . 110.6. In this illustrative network, the network devices, referred to as 120.1, . . . 120.n, 130.1 . . . 130.n and 140.1 . . . 140.n, represent routers, servers, switches, input/output stations, etc., that constitute a network 100 and are suitable for completing a transaction. More specifically, each of the elements of network 100 may be, but need not be controlled or operated by a single source or entity and requires the cooperative interaction between the elements. For example, network 110.2 between devices 120.1 and 130.1 may represent a local area network (LAN) between a user station 120.1 and a gateway 130.1 to the illustratively broader network 110.1; e.g., the internet. On the other hand devices 120.3 and 120.4 may have a direct link to gateway 130.2 to the broader network 110. Similarly, the devices within network 110 may be interconnected using direct link, e.g., device 140.4 to 140.5, or using subnetworks, e.g., 110.3, between devices 140.4 and 140.1.

Also illustrated is that each of the devices is associated with an SLO (Service Level Objective) and selected ones of the devices are associated with SLAs (Service Level Agreements). A Service Level Objective is a measurement of a performance, whether desired or actual, associated with a device. For example, device 130.2, network 110.4 and device 140.4 may each have an SLO associated with utilization, capacity and/or bandwidth. Utilization may be the measure of a CPU usage, a memory usage, a data rate transfer, etc. A Service Level Agreement is a measure of an end-to-end performance of a higher level function, e.g., an application, hosted or performed by the underlying infrastructure or network configuration. For example, device 130.2 may also have an associated SLA associated with a transaction that is performed by an application. An SLA may, for example, be represented as the time from when an entry is made on device 120.1 until a response to the entry is received back at device 120.1.

Figure 2A:
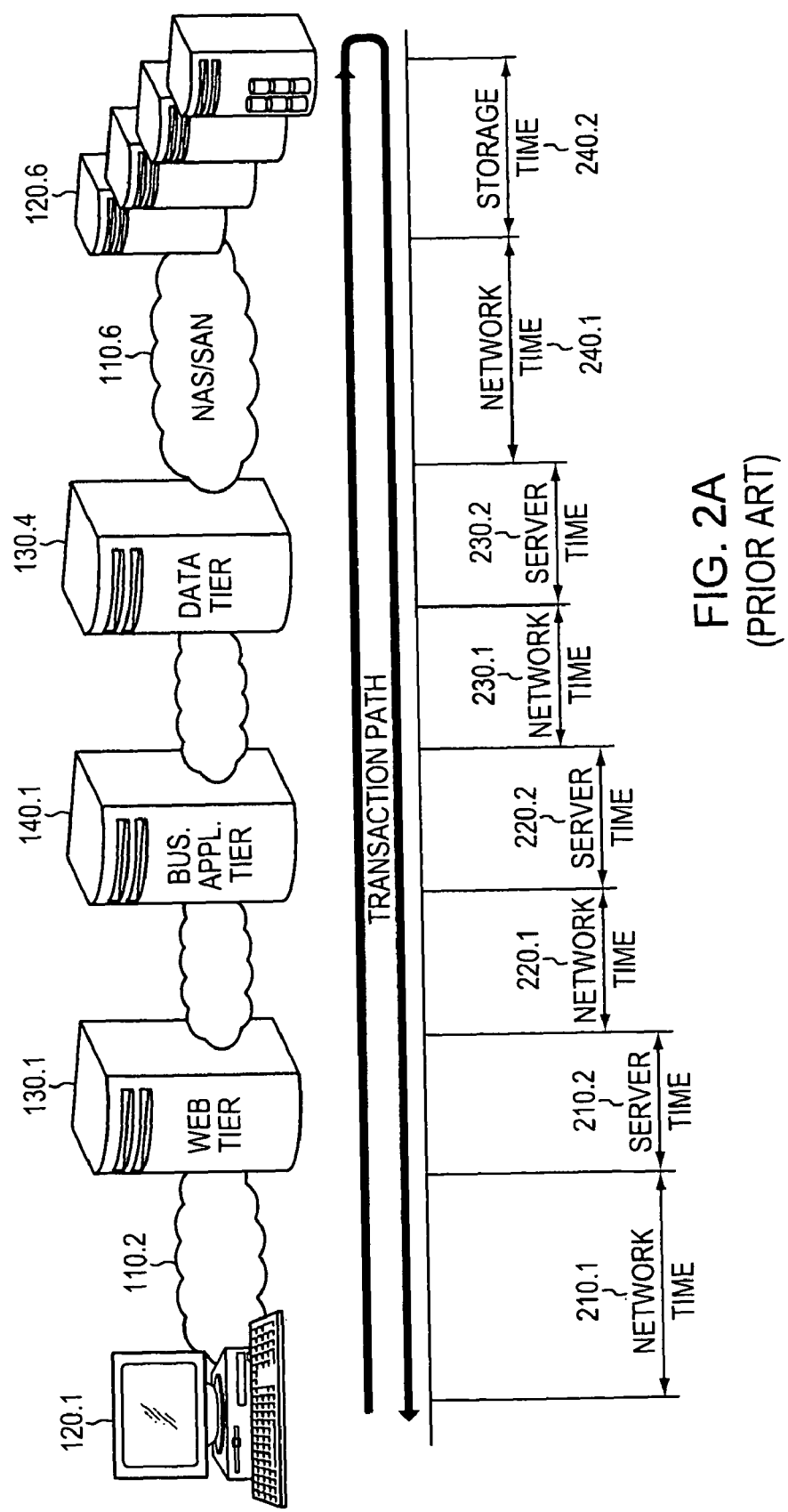
FIG. 2A illustrates an exemplary timing diagram for processing typical transactions.

FIG. 2A illustrates a timeline for determining an exemplary time to complete a transaction, i.e., a service, to an entry made at device 120.1 in an exemplary network. In this illustrative example, the time to complete the transaction of an entry made at device 120.1 includes the time, 210.1, for the entry to transit network 110, the time, 210.2 to process the entry at device (web tier server) 130.1 after traversing the network 100.2, the time to traverse a network or link to device 140.2 and the time 220.2 to process the entry at device 140.2. It would be recognized that the processing associated with server time 210.2 and 220.2 may be physically performed on the same device and, thus, the network time 220.1 may be non-existent and is merely logically represented herein. Similar network transitions and processor times are associated with each device in the path to complete the transaction; in this case, from device 120.1 to storage devices 120.6 and return. Thus, the service time or transaction path time, is determined as the serial accumulation of each of the measurable times. In a best case scenario, the minimum time to complete a transaction is the minimum time to complete each of the operations for each of the devices in the path. However, as the number of entries entering the network increases, one or more of the network response times or server response times may also increase as the operating loads at individual servers or devices increases. Accordingly, the time to complete the transaction increases until a point where a required SLA to complete the transaction may become unacceptable. In this case, identification of the sources of the increase in time is necessary to either introduce additional equipments to unburden the device or devices causing the increase in the transaction response time or to determine alternate routes by which the transactions may proceed.

Figure 2B:
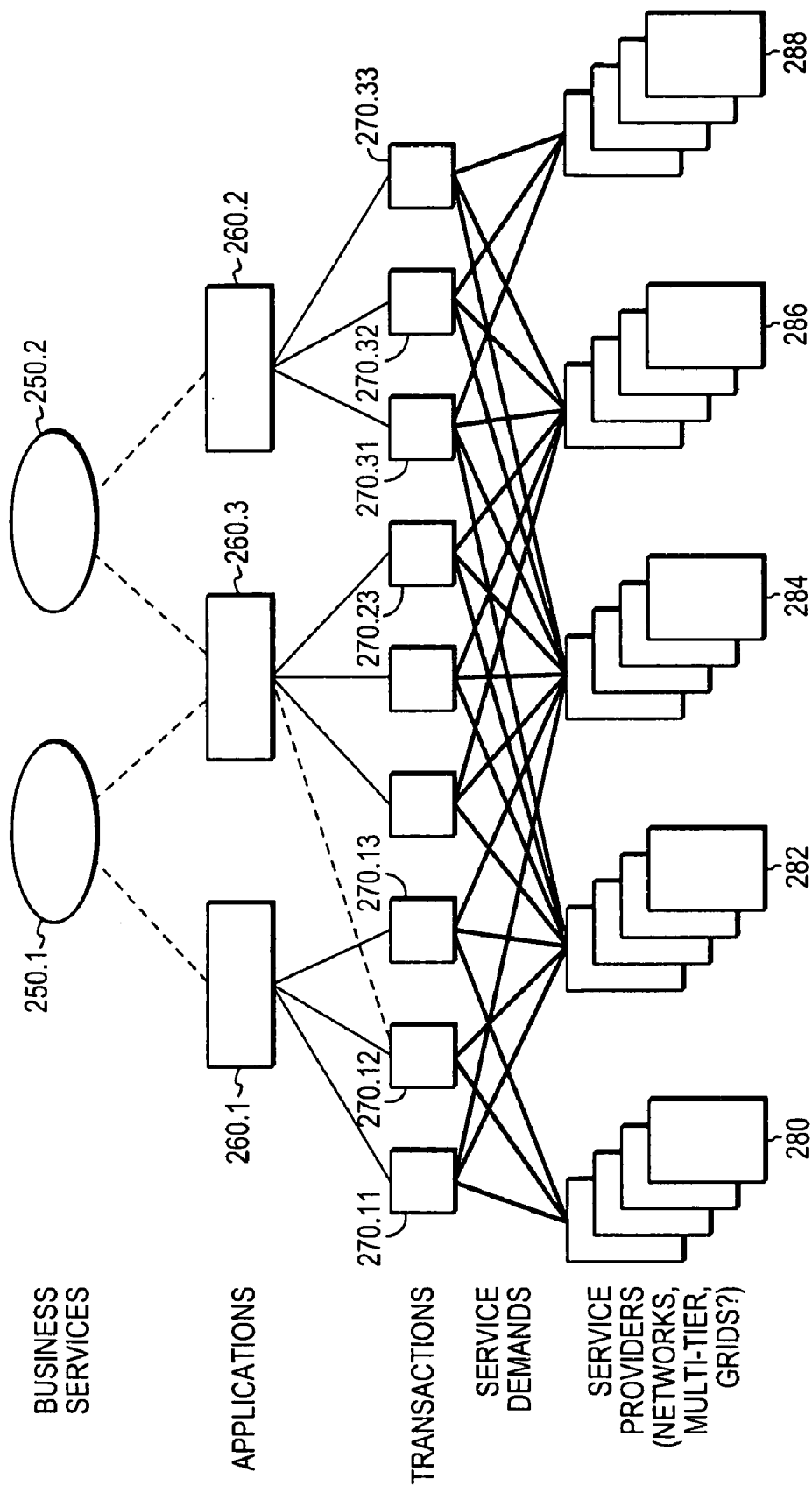
FIG. 2B illustrates a model representation of a typical network serving transactions from multiple applications.

FIG. 2B illustrates an exemplary model representation of transactions performed over a network environment. In this illustrative case, a business may provide one or more services, e.g., purchasing a product over the internet, to users, 250.1, 250.2. The business services, 250.1, 250.2, may each execute one or more service specific applications 260.1, 260.2 and common application 260.3. Each of the applications 260.1, 260.2, and 260.3 may execute one or more transactions 270.11, 270.13 . . . 270.23 that are specific to a particular application or may be shared among the applications, e.g., transaction 270.12. Transactions may be considered operations such as Display, Create, Update, Delete of a file or an entry in a file or may be an action such as Submit or Cancel. Each of the transactions further operates on or is hosted by one or more underlying network elements, such as routers, servers, switches, etc. In this illustrative example, the underlying network elements are grouped together to form logical entities, 280, 282, . . . 288, associated with the business service being provided.

In the illustrated model, the business service 250.1 may represent the presentation of items that a business may be offering for sale to the general public or may be a service to be provided or an interactive operation, e.g., a game or contest. The service 250.1 may use a graphic user interface (GUI) that allows a user to view information (e.g., description and cost) of the presented items and further enable the user to enter corresponding data (e.g., personal information, financial information) for ordering the item or providing instruction. Business service 250.2 may represent the response that a confirmation of the order has been received and further initiate processes within the application to fulfill the order placed. Business service 250.1, thus, may execute or invoke application 260.1 to display the GUI to the user, invoke application 260.3 to process the user entered data and make the user entered information available to business service 260.2. Service 250.2 utilizes the information provided by application 260.2 to confirm the user data is acceptable and application 260.3 completes the order process. Transactions 270.11, 270.12 . . . 270.23 represent the individual processing steps required to complete the processing of the associated applications. Service providers 280 . . . 288 represent the underlying physical entities (e.g., communication protocols, communication links, network elements, software elements, etc.) necessary to complete the transaction. Services providers 280 . . . 288 may represent the logically entities associated with the elements 120.1, 130.1, 140.2 130.4 and 120.6 shown in FIG. 2A.

Figure 3A:
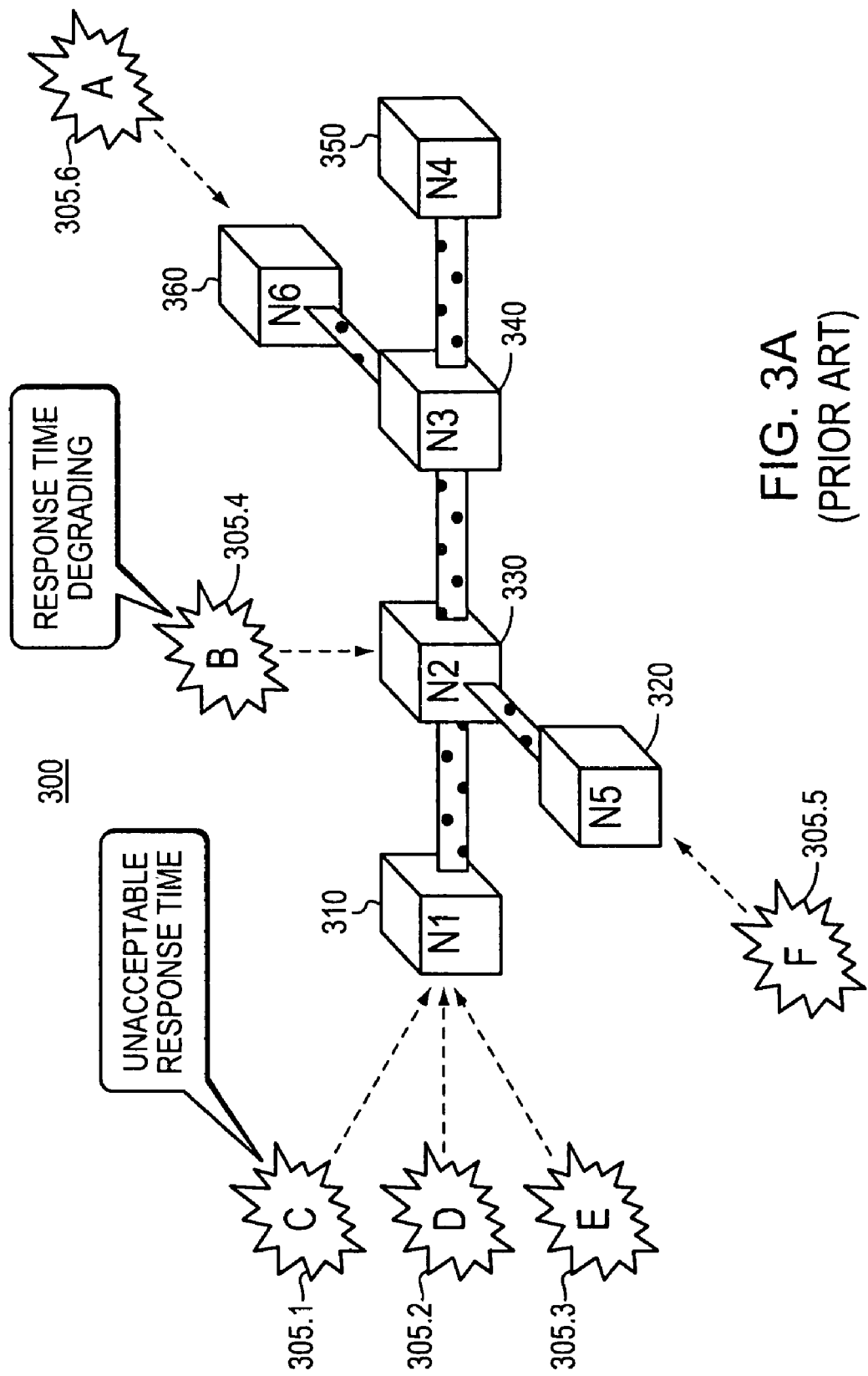
FIGS. 3A and 3B illustrate exemplary operating conditions in a conventional network.

FIG. 3A illustrates an exemplary situation wherein an unacceptable SLA may occur because of inappropriate loading within a network; an SLO being exceeded. In this illustrative case, devices 305.1, 305.2, and 305.3 are connected to a network through device 310. Device 305.4 is connected to the network through device 330 and device 305.5 is connected to the network through device 320. Device 320 is further connected to device 330. Also device 305.6 is connected to the network through device 360, which is further connected to device 340. Device 340 is further connected to devices 330 and 350. Device 350 represents the end-point of the illustrative network. In this illustrated example, devices 305.1, 305.2 and 305.3 may exhibit acceptable response time until such time that devices 305.4 and/or 305.5 are connected, and begin to provide data, to the network. In this case, the response time (SLA) associated with a transaction initiated at device 305.1 may increase significantly or become unacceptable because of the additional load imposed upon the system. This unacceptable response time may be caused by device 330, for example, having insufficient capacity to handle the additional data load. In another example, when device 305.6 comes on-line, the response time associated with device 305.4 may also, as illustrated, become unusually high, and degradation in the response time of device 305.4 may be noticed.

In each of these situations, the response time (SLO) that is measured at device 305.1 or device 305.4 indicates some device error condition. However, the cause of the error condition is not the indicating device, as the degraded SLA is noticed, but rather from some operating condition within one of the network devices; in this case, device(s) 330 and/or 340.

Figure 3B:
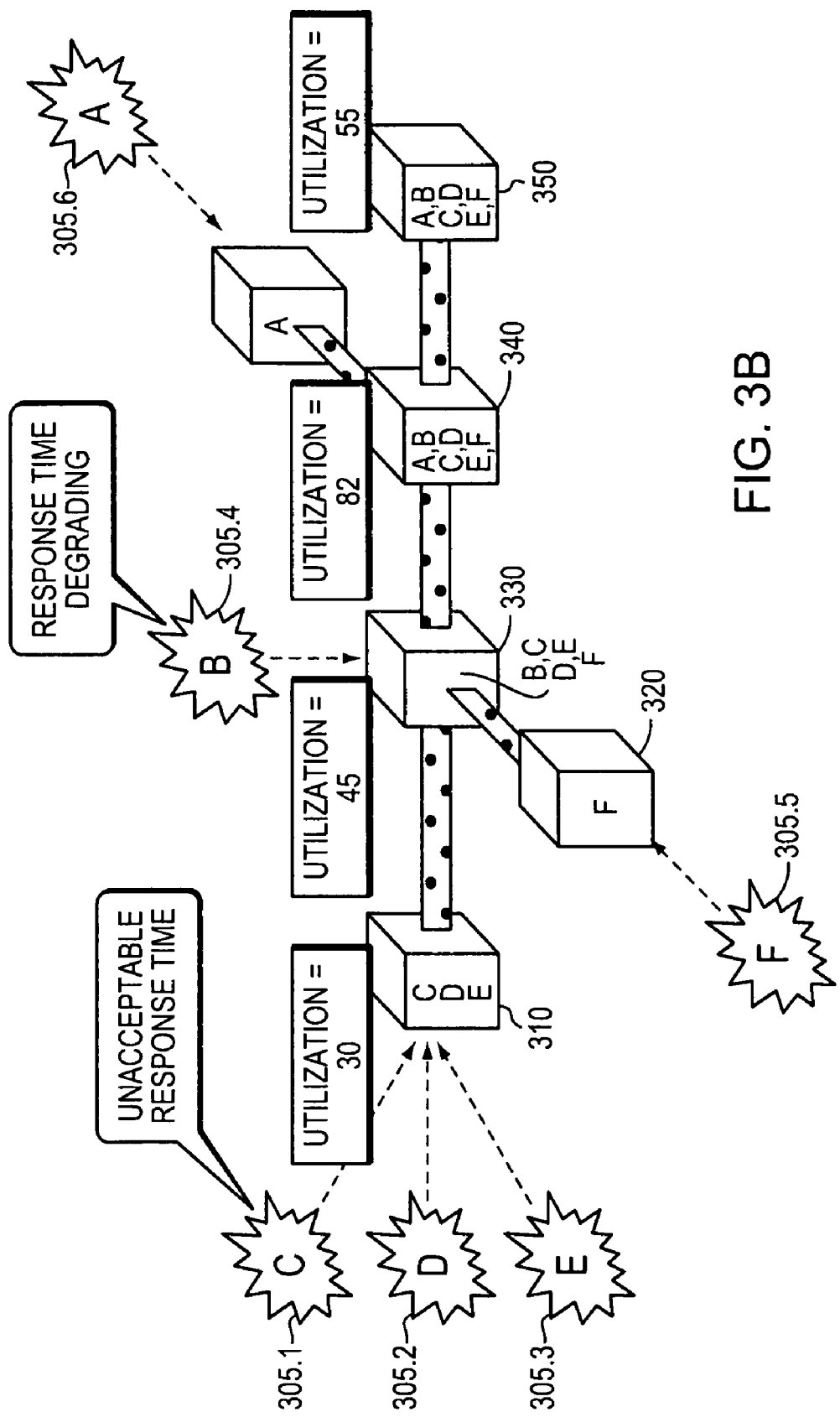

FIG. 3B illustrates an example of the situation shown in FIG. 3A, wherein a measurable utilization, e.g., CPU, I/O, buffer status, etc., is used to represent a device SLO. The selected utilization of each device may be monitored and measured to determine an impact on an overall transaction SLA. In this illustrative case, device 310 possesses a utilization factor of 30 when data is received from devices 305.1, 305.2 and 305.3. Utilization may be determined by factors such as CPU speed, memory, data throughput, input/output buffer sizing, distributed among the one or more devices represented by device 310, etc. It would be appreciated that each of the network elements 310, 330, 340 and 350 may logically represent at least one hardware device and/or software program hosted by the devices.

Device 330 possess a utilization factor of 45 when data is received from devices 305.1, . . . 305.5 at device 330. In this illustrative example, a utilization factor of 45 at device 330 may represent a burden that causes the response time of device 305.1 to degrade or even become unacceptable. As would be recognized, the utilization factor of device 330 is determined based on the operating conditions of device 330. The utilization factor of device 330 may or may not represent a normalization of the utilization factor with regard to the utilization factors of other devices in the network. Thus, a value of 45 associated with device 330 may not necessarily represent a higher utilization of device 330 than that of device 310, for example. However, in this illustrative example, and for simplifying the description of the invention, the utilization factor of the devices, as described herein, is considered to be normalized so that a higher utilization factor represents a greater measured use of the resources associated with the device.

Also illustrated is the utilization factor of device 340 at 82 when device 305.6 is providing data to the network. In this illustrative case, the utilization factor has increased as device 340 is processing data from each of the source devices 305.1 . . . 305.6. Similarly, device 350 is shown processing data from each of the source devices 305.1 . . . 305.6 and possessing a utilization factor of 55. As described above, in this situation, the transaction time associated with device 305.1 may degrade to a point where it is unacceptable and that the SLO associated with device 305.4 degraded to a point where it is very close to being unacceptable. However, whether device 340 or 350 is the source of the unacceptable or degraded performance of the overall SLA is unknown. For example, device 350 may be designed for a utilization of 50 and, thus, the illustrative utilization factor of 55 exceeds the design criteria, while device 340 may be designed for a utilization of 90 and does not exceed its design criteria. Thus, the unrelated device utilization factors (SLOs) may be used to determine the effect on the higher level service SLA.

Figure 4:
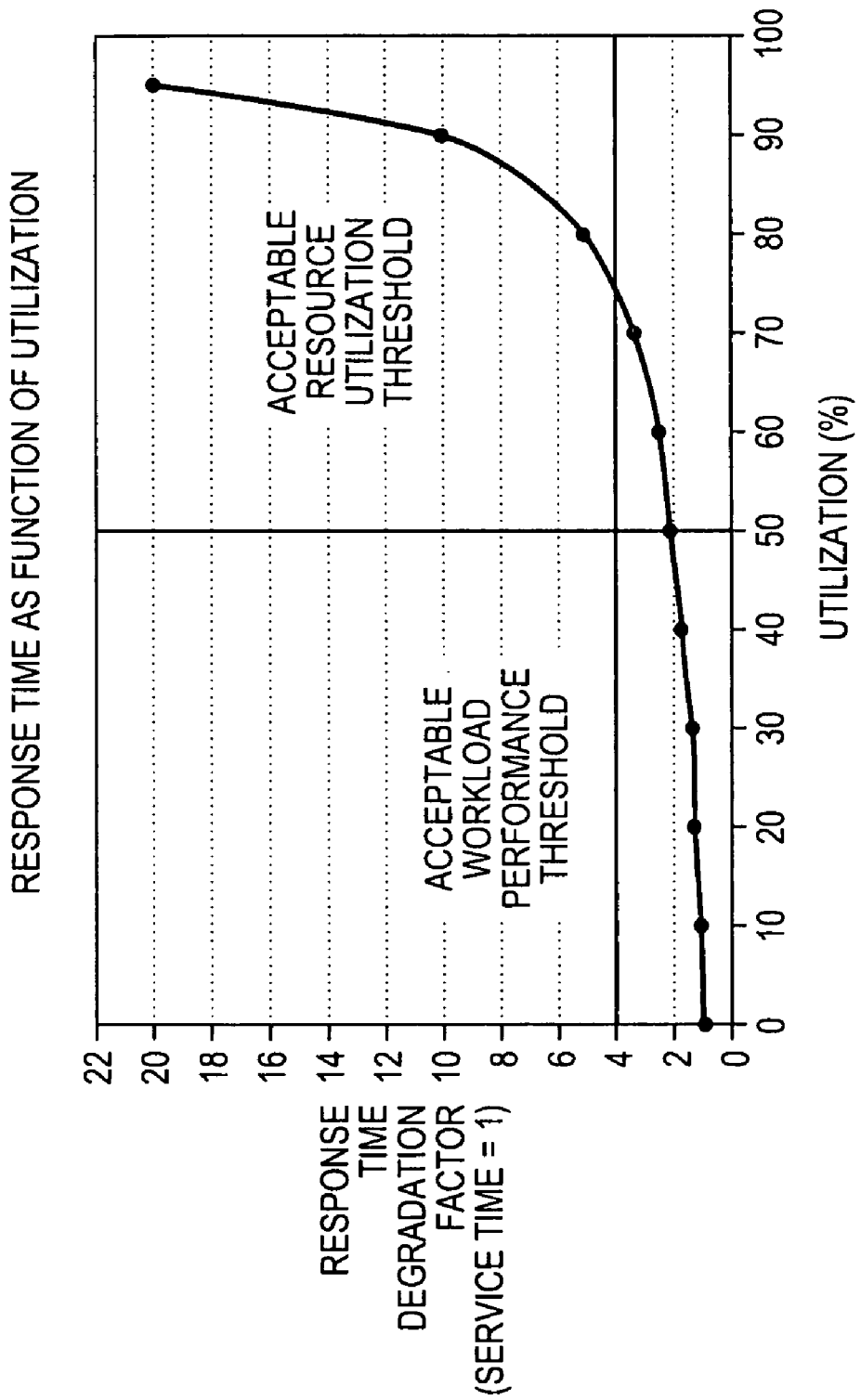
FIG. 4 illustrates a representation for determining operating conditions in accordance with the principles of the invention.

FIG. 4 graphically illustrates an exemplary method for determining an SLO threshold to fulfill a desired SLA requirement. More specifically, a device response time may be determined as:

$$\text{Service rate}=1/(\text{Service time}) \quad [1]$$

where Service time represents the time for the device to service an input.

The utilization may be determined as:

$$\text{Utilization}=\text{Arrival rate}/\text{Service rate} \quad [2]$$

where Arrival rate represents the average rate of arrival of an input data packet.

The device response time may then be determined as:

$$\text{Response Time}=\text{Service time}/(1-\text{Utilization}). \quad [3]$$

From equation 3, a device response time may be determined based on a desired utilization. Alternatively a maximum utilization may be determined based on a desired response time, as shown in FIG. 4.

After determining a response time for each of the devices and/or networks in a transaction path, a transaction response time ($R_t$) may be determined, as shown in FIG. 2, as:

$$R_t = \Sigma_1^{ndevices} \text{ResponseTime} \quad [4]$$

From equation 4, the response time, and corresponding utilization (SLO) of each device may be appropriately adjusted to achieve a desired transaction response time, $R_t$, and provide margin to indicate when an SLA may be impacted based on the conditions of one or more SLOs.

The information regarding a required transaction time or utilization factor per (logical) device may be used to determine a threshold value lower than a time or utilization factor associated with the device. The device may then be monitored with regard to the measured quantity to determine whether the corresponding device is experiencing or about to experience a condition that may affect the overall SLA. For example, when the measured utilization factor associated with a device exceeds a determined threshold value, an event, i.e., a triggering event, may be generated that indicates a potential error condition may exist. Thus, before an unacceptable SLA condition is detected, an event, associated with an underlying SLO, may be generated to forewarn of the potentially unacceptable SLA and knowledge of the cause of the triggering event(s) may be used to determine a remedial action.

In another aspect, after a triggering event occurs, an associated threshold value may be adjusted to, or be replaced by, an alternate threshold value. In this case, when the second threshold value is exceeded a second triggering event may be generated to provide additional information regarding the continued potential of an overloaded or overburdened device. In this aspect of the invention, the threshold value may be dynamically adjusted to monitor the increase in utilization and provide ever increasing urgency in the need for some corrective action. The monitoring of the events could register the occurrence of an increased utilization or a change in utilization per unit time.

In one aspect of the invention, after the first, second or the occurrence of any other number of similar triggering events, the associated information provided may be utilized to initiate or setup additional resources to assist the potentially overloaded device.

Returning to the example shown in FIG. 3B, indicators may be generated from each of elements 305.1, 350, and possibly 340, as the utilization factors increase as additional devices (and data) are introduced into the network. More specifically, element 305.1 may generate an indicator or event to signify the determination that the response time has reached or exceeded an associated threshold value(s) or has even exceeded the allowable SLO. Similarly, the element 350 may generate one or more indicators to signify that its utilization (SLO) has reached or exceeded an associated threshold value(s) or even exceeded the allowable SLO. In addition, element 340 may generate an indicator to signify that the utilization factor (in this illustrated case, 82) while not exceeding a design criterion, may exceed an established threshold value. Thus, element 340 may be considered operating at a utilization level that has the potential of exceeding a maximum value if additional users or data are introduced into the network. The high utilization levels illustrated may introduce significant processing delays such that the SLA of a transaction performed by element 305.1 is close to, or exceeds, its maximum allowable value.

Thus, as shown, a number of related and dependent indicators may be generated because of the operating conditions of one or more network elements. In one aspect of the invention, each of the generated indictors are processed and evaluated to determine which of the network elements requires immediate attention and which of the network elements are generating indicators because of other factors in the network. Preferably, a method and system similar to that discussed in commonly-owned U.S. Pat. Nos. 5,528,516; 5,661,668; 6,249,755; 6,868,367, and 7,003,433, the contents of which are incorporated by reference herein, may be used to determine the cause of the triggering events or indicators being generated. The aforementioned US Patents teach performing a system analysis based on a mapping of observable events and detectable events, e.g., symptoms and problems, respectively. With respect to the present invention, the generation of triggering events associated with performance issues represent the observed symptoms, and the causes associated symptoms are represented as problems.

Figure 5A:
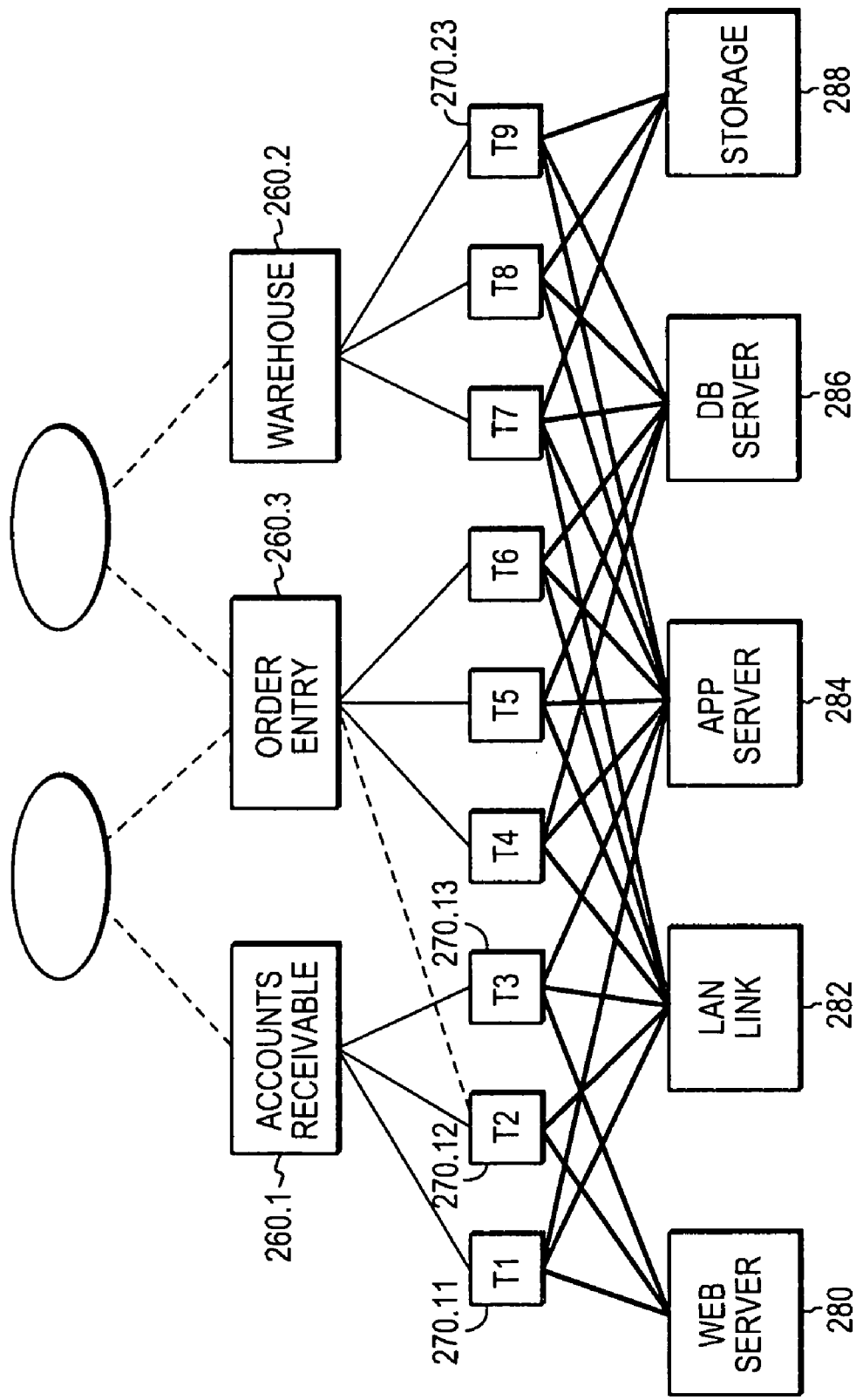
Figure 5B:
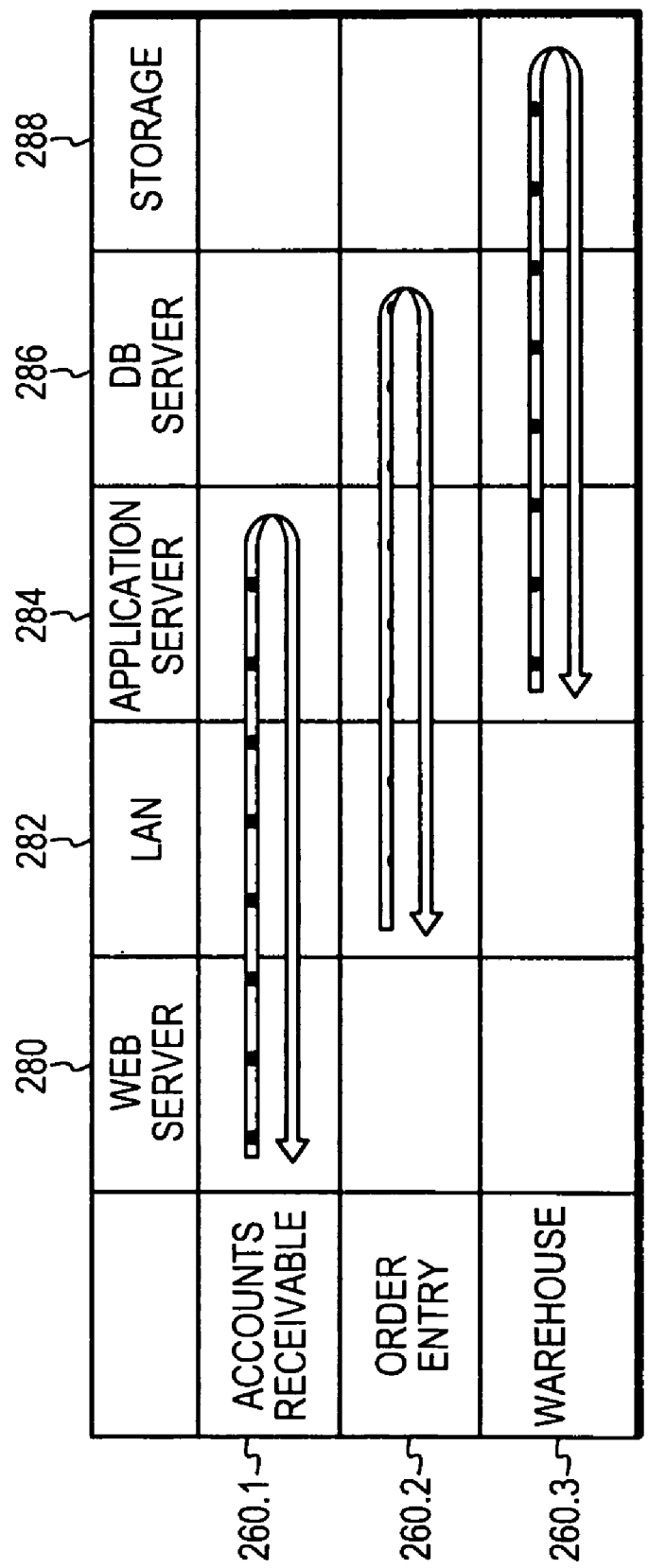

FIGS. 5A-5C collectively illustrate an exemplary model of a business transaction and a method of determining the causes or sources of performance degradation in the business transaction in accordance with the principles of the invention. FIG. 5A illustrates an exemplary business process, similar to that shown in FIG. 2A, that includes applications referred to as Accounts Receivable, 260.1, Order Entry, 260.3 and Warehouse 260.2. Application Receivable 260.1 refers to those processes, illustrates as transactions T1, 270.11, T2, 270.12 and T3, 270.13, which enable a user to (1) view, either textually or visually, products or services that may be offered for sale, (2) enter personal data such as name, and address, and financial data, such as credit card information, and (3) submit the entered information along with the product information. Similarly, Order application 260.3, incorporates processes, i.e., transactions T4, T5 and T6, to process the information provided by the user and operates on the provided data to charge the user for the selected items and provide necessary information to a warehouse application 260.2 to collect and ship the selected items. Warehouse application 260.2 incorporates processes, i.e., transactions T7, T8 and T9, 270.23, to receive data regarding user personal information and shipping, if required, the selected items to the user.

Also illustrated are the underlying elements that are utilized in processing each of the transactions of each of the applications. In this case, the underlying elements are represented as WebServer 280, LanLink 282, ApplicationServer 284, DataBaseServer 286 and Storage 288. WebServer 280 logically represents the hardware and software elements that enable an interactive communication between a business and a user, e.g., a web browser, GUI, etc. LANLink 282 represents the Local Area Network links that allow communication between the user and the business, e.g., the internet. ApplicationServer 284 represents the server(s) that host the business application. DBServer 286 represents part of the business' backend processing and as illustrated is independent of the user inputs. That is, the AccountsReceivable application, which allows interactive communications between the user and the business, has no transactions associated with the DBServer 286. Storage 288 represents the storage media that records the user provided information, the business inventory, etc.

Although, the business transaction shown herein is limited with regard to the number of applications and transactions performed by each application, it would be recognized that this limitation is only for the purpose of illustrating the principles of the invention and should not be considered as a limitation upon the number or type of applications or transactions that may be performed by a business transaction. Similarly, the exemplary model shown with regard to a typical business transaction and should not be considered as a limitation on the type of business transactions that are considered within the scope of the invention.

FIG. 5B illustrates, graphically, the round trip transaction time for each of the applications with respect to the underlying elements, WebServer, LAN, ApplicationServer, DBServer and Storage. In this illustrative example, the time required for the AccountReceivable application to complete is based on only three of the five illustrated elements. Similarly, the time required for the OrderEntry and the Warehouse applications to complete is based on three of the five illustrated applications. From FIG. 5B it can be seen that a degradation in the processing of WebServer 280 affects only the AccountsReceivable application 260.1, whereas a degradation in the processing of ApplicationServer 284 affects each of the applications.

FIG. 5C illustrates an exemplary correlation matrix for determining a cause of a degradation in system performance in accordance with the principles of the invention. In this illustrative correlation matrix, the columns, denoted as SP1 . . . SP5, represent the underlying elements WebServer, LANLink, ApplicationServer, DBServer and Storage, respectively. The rows represent observable events that may be generated because of a physical failure of one or more of the underlying elements or a degradation in one or more of the transactions associated with the applications. More specifically, the rows labeled SP1 . . . SP5, represent the underlying elements WebServer, LANLink, ApplicationServer, DBServer and Storage, respectively, as discussed. In this case, an error occurring within the WebServer is caused only by the WebServer element. Hence a value or indicator, which may be a fixed value, i.e., logical "1" or a probabilistic value p, at the intersection of the appropriate row and column may be used to indicate that the associated entry has exceeded a predetermined threshold value. Similarly, when a transaction, such as T1, indicates a degraded performance has been determined, i.e., a utilization factor threshold has been exceeded, and the cause of the degraded performance may be attributed to one or more of elements (SP1, SP2 or SP3). In a similar manner, if transaction T4 indicates a degraded performance, then the cause of the degraded performance may be attributed to one or more of SP2, SP3 or SP4.

Utilizing the information associated with each of the observed events, a cause of observed events may thus be determined. For example, if observed event(s) associated with each of T1 through T9 occurs and no indication is provided that SP3 has outright failed, then it may unambiguously determined that SP3 is operating beyond its performance capability or capacity. In a similar manner, if events associated with the performance of transactions t1, t2 and/or t3 are detected without any indications of degraded performance from transactions t4-t6 and/or t7-t8, then it may be determined that operations associated with SP1 have exceeded desired criterion or criteria.

Figure 6:
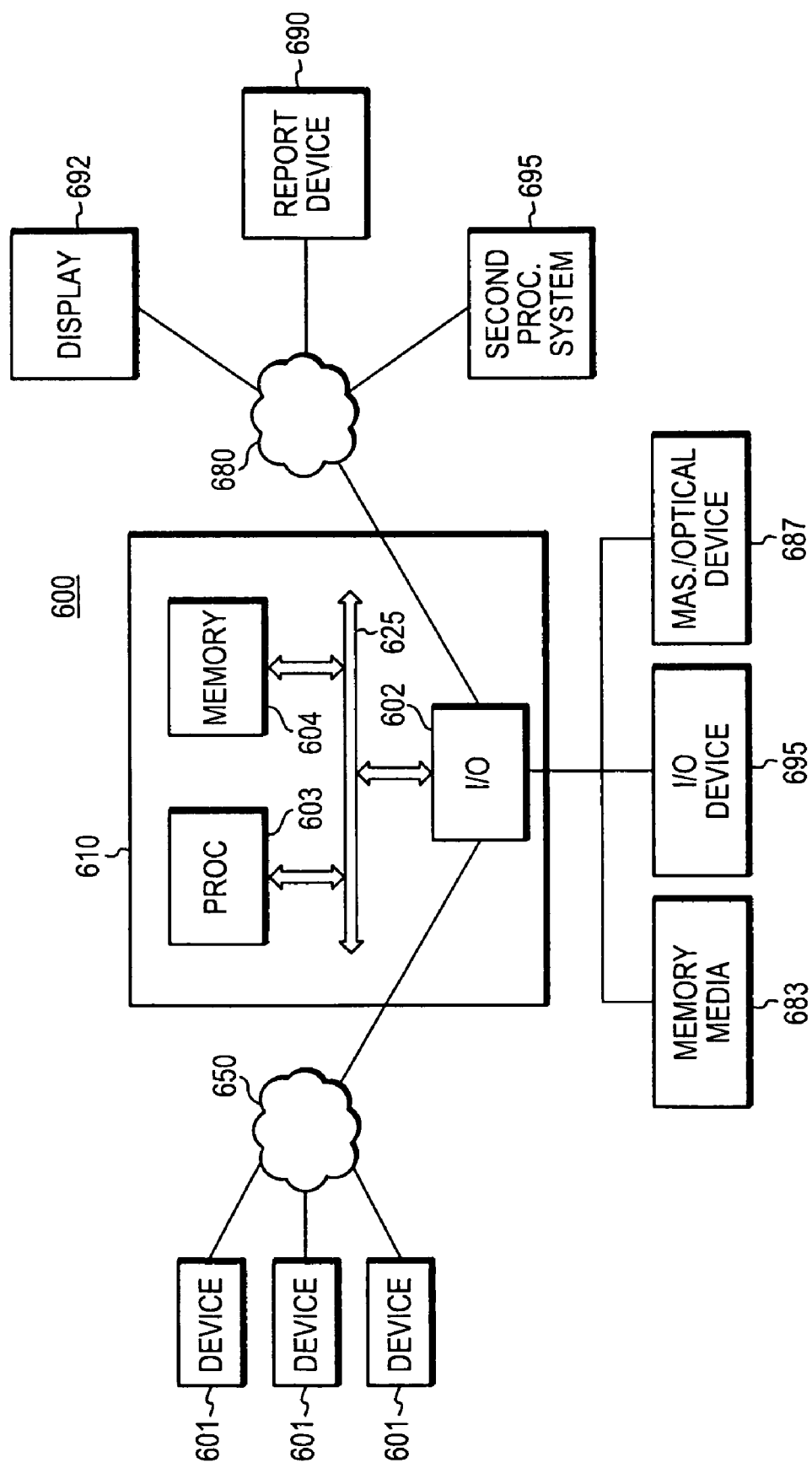
FIG. 6 illustrates an exemplary system for implementing the processing shown herein It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements

FIG. 6 illustrates an exemplary embodiment of a system 600 that may be used for implementing the principles of the present invention. System 600 may contain one or more input/output devices 602, processors 603 and memories 604. I/O devices 602 may access or receive information from one or more sources or devices 601. Sources or devices 601 may be devices such as routers, servers, computers, notebook computer, PDAs, cells phones or other devices suitable for transmitting and receiving information responsive to the processes shown herein. Devices 601 may have access over one or more network connections 650 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 602, processors 603 and memories 604 may communicate over a communication medium 625. Communication medium 625 may represent, for example, a bus, a communication network, one or more internal connections of a circuit, circuit card or other apparatus, as well as portions and combinations of these and other communication media. Input data from the client devices 601 is processed in accordance with one or more programs that may be stored in memories 604 and executed by processors 603. Memories 604 may be any magnetic, optical or semiconductor medium that is loadable and retains information either permanently, e.g. PROM, or non-permanently, e.g., RAM. Processors 603 may be any means, such as general purpose or special purpose computing system, such as a laptop computer, desktop computer, a server, handheld computer, or may be a hardware configuration, such as dedicated logic circuit, or integrated circuit. Processors 603 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 604. The code may be read or downloaded from a memory medium 683, an I/O device 685 or magnetic or optical media, such as a floppy disk, a CD-ROM or a DVD, 687 and then stored in memory 604 or may be downloaded over one or more of the illustrated networks. As would be appreciated, the code may be processor-dependent or processor-independent. JAVA is an example of processor-independent code. JAVA is a trademark of the Sun Microsystems, Inc., Santa Clara, Calif. USA.

Information from device 601 received by I/O device 602, after processing in accordance with one or more software programs operable to perform the functions illustrated herein, may also be transmitted over network 680 to one or more output devices represented as display 685, reporting device 690 or second processing system 695.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It would be recognized that the invention is not limited by the model discussed, and used as an example, or the specific proposed modeling approach described herein. For example, it would be recognized that the method described herein may be used to perform an analysis that may include: fault detection, fault monitoring, performance, congestion, connectivity, interface failure, node failure, link failure, routing protocol error, routing control errors, and root-cause analysis. In addition, although the invention described herein is described with regard to network-based services it would be recognized that the method described is applicable to services provided over distributed systems.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for determining the cause of a degradation of a service provided over a network composed of a plurality of hardware and software elements, the service including a plurality of applications each including at least one transaction, the transactions being executed by selected ones of the hardware and software elements, the method executing without user interaction, the method comprising:

obtaining a service level objective (SLO) corresponding to a set of service level objective for service on a network;

establishing, in one or more computers, a performance objective value, and a threshold value therefrom, for selected ones of the transactions for each of the applications, wherein the aggregate of the performance objective values insures a known service performance; wherein exceeding the threshold value indicates a potential error condition associated with the SLO;

monitoring, in the one or more computers, a measure of performance for each of the selected transactions;

generating, in the one or more computers, a computer readable indication for each of the performance measures that exceeds a corresponding threshold value;

associating a respective relationship between each of the transactions and each of the elements executing the transaction; and determining a match between the generated indications using the respective relationships associated with each of the elements executing the transaction; and determining, in the one or more computers in response to each generated computer readable indication of a performance measure exceeding a corresponding threshold value, the cause of the degradation by correlating the transactions generating the indication with the elements executing the transaction before the SLO is violated.

2. The method as recited in claim 1, wherein the performance objective value is determined as a function of a time to process an input and an arrival rate of inputs.

3. The method as recited in claim 1, wherein the threshold value is determined based on a desired factor of the performance objective value.

4. The method as recited in claim 1, wherein the associated relationship is selected from the group consisting of: fixed value and probabilistic value.

5. The method as recited in claim 1, further comprising the step of:

associating each of the selected transactions with at least one of the network elements.

6. An apparatus for determining the cause of a degradation of a service provided over a network composed of a plurality of hardware and software elements, the service including a plurality of applications each including at least one transaction, the transactions being executed by selected ones of the hardware and software elements, the apparatus comprising:

a processor in communication with a memory, the processor executing software instructions, without user interaction, to execute the steps of:

establishing, in one or more computers, a performance objective value, and a threshold value therefrom, for selected ones of the transactions for each of the applications, wherein the aggregate of the performance objective values insures a known service performance; wherein exceeding the threshold value indicates a potential error condition associated with the SLO;

monitoring, in the one or more computers, a measure of performance for each of the selected transactions;

generating, in the one or more computers, a computer readable indication for each of the performance measures that exceeds a corresponding threshold value;

associating a respective relationship between each of the transactions and each of the elements executing the transaction; and determining a match between the generated indications using the respective relationships associated with each of the elements executing the transaction; and determining, in the one or more computers in response to each generated indication of a performance measure exceeding a corresponding threshold value, the cause of the degradation by correlating the transactions generating the indication with the elements executing the transaction before the SLO is violated.

7. The apparatus as recited in claim 6, wherein the performance objective value is determined as a function of a time to process an input and an arrival rate of inputs.

8. The apparatus as recited in claim 6, wherein the threshold value is determined based on a desired factor of the performance objective value.

9. The apparatus as recited in claim 6, wherein the assigned value is selected from the group consisting of: fixed value and probabilistic value.

10. The apparatus as recited in claim 6, wherein the processor further executing software instruction for executing the step of:

associating each of the transactions with at least one of the network elements.

11. A computer-program product for determining the cause of a degradation of a service provided over a network composed of a plurality of hardware and software elements, the service including a plurality of applications each including at least one transaction, the transactions being executed by selected ones of the hardware and software elements, the computer-program product providing instruction to a processor to execute the steps, without user interaction, of:

establishing, in one or more computers, a performance objective value, and a threshold value therefrom, for selected ones of the transactions for each of the applications, wherein the aggregate of the performance objective values insures a known service performance; wherein exceeding the threshold value indicates a potential error condition associated with the SLO;

monitoring, in the one or more computers, a measure of performance for each of the selected transactions;

generating, in the one or more computers, a computer readable indication for each of the performance measures that exceeds a corresponding threshold value;

associating a respective relationship between each of the transactions and each of the elements executing the transaction; and determining a match between the generated indications using the respective relationships associated with each of the elements executing the transaction; and determining, in the one or more computers in response to each generated computer readable indication of a performance measure exceeding a corresponding threshold value, the cause of the degradation by correlating the transactions generating the computer readable indication with the elements executing the transaction before the SLO is violated.

12. The computer-program product as recited in claim 11, wherein the performance objective value is determined as a function of a time to process an input and an arrival rate of inputs.

13. The computer-program product as recited in claim 11, wherein the threshold value is determined based on a desired factor of the performance objective value.

14. The computer-program product as recited in claim 11, wherein the assigned value is selected from the group consisting of: fixed value and probabilistic value.

15. The computer-program product as recited in claim 11, providing further instruction to the processor to execute the step of:

associating each of the transactions with at least one of the network elements.

\* \* \* \* \*